(12) United States Patent
Berstis

(10) Patent No.: US 7,676,435 B1
(45) Date of Patent: Mar. 9, 2010

(54) METHOD AND SYSTEM FOR TRIGGERING ENHANCED SECURITY VERIFICATION IN RESPONSE TO ATYPICAL SELECTIONS AT A SERVICE-ORIENTED USER INTERFACE TERMINAL

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 09/466,438

(22) Filed: Dec. 17, 1999

(51) Int. Cl.
*G06Q 40/00* (2006.01)
(52) U.S. Cl. .......................................... 705/44; 705/39
(58) Field of Classification Search ................... 705/39, 705/44
See application file for complete search history.

(56) References Cited

U.S. PATENT DOCUMENTS

| | | | |
|---|---|---|---|
| 5,311,594 A | | 5/1994 | Penzias |
| 5,345,549 A | | 9/1994 | Appel et al. |
| 5,774,525 A | | 6/1998 | Kanevsky et al. |
| 6,108,642 A | * | 8/2000 | Findley ....................... 235/380 |
| 6,496,936 B1 | * | 12/2002 | French et al. .................. 726/7 |

OTHER PUBLICATIONS

Knight., J. et al. "Cashing on Caching.com" 2002.*
Murphy., P.A., "Fighting Internet Card Fraud," Credit Card Management, vol. 13, No. 4, Jul. 2000 pp. 18-26.*
Angel, J., "Directories and the Internet" Network Magazine, vol. 18, No. 8, Aug. 1999., pp. 58-62.*

\* cited by examiner

*Primary Examiner*—Daniel S Felten
(74) *Attorney, Agent, or Firm*—Dillon & Yudell LLP

(57) ABSTRACT

A method and system for prompting a repeat user of a payment card at an interface terminal with additional security-related questions when the user selects responses that deviate from his or her typical selections. The payment card is read at the terminal, its line of credit is authorized, and a profile of the user's purchasing habits is retrieved. The user then enters his or her current selection of options. A determination is then made as to whether the user's current selections match his or her user profile. If the user's current selections match the user profile, the process allows the user to obtain the services or facilities. If the user's current selections do not match the user profile, the process queries the user with additional security questions to ascertain whether the current user is an authorized user. If the user is unable to answer the security questions correctly, the process prevents the user from accessing the services or facilities. If the user is able to answer the security questions correctly, the process allows the current user to begin fueling his or her vehicle.

21 Claims, 3 Drawing Sheets

METHOD AND SYSTEM FOR TRIGGERING ENHANCED SECURITY VERIFICATION IN RESPONSE TO ATYPICAL SELECTIONS AT A SERVICE-ORIENTED USER INTERFACE TERMINAL

BACKGROUND OF THE INVENTION

1. Technical Field

This invention relates in general to a method and system for interfacing with customers at service-oriented terminals, and in particular to a method and system for service-oriented, user interface terminals where users make purchases electronically. Even more particularly, the invention relates to a system and method for automatically authorizing a remote point of purchase action at a facility which permits such actions. The system prompts a user with additional security-related questions when the user selects responses that deviate from the user's typical selections.

2. Description of Related Art

Service-oriented, user interface terminals for making purchases electronically, such as with a commercial credit card or debit card, are now common. These types of terminals are typically utilized wherever a basic or routine transaction can be processed more efficiently on site without the need for human intervention or judgment. Examples include fuel pumps of automotive refueling stations, automated vending machines for purchasing tickets for transportation (e.g., airline tickets), personalized greeting card vending machines, and the like. Users of such terminals tend to become repeat customers and, in many instances, select the same set of options every time they make a transaction. For example, whenever an individual uses his or her credit card to purchase automotive fuel directly at the fuel pump, he or she may always choose the premium grade of fuel, never want a receipt, and always select the lowest priced car wash.

To use these terminals, users are merely required to swipe their electronic card through a reading device (thereby entering their account information into the system) and wait for approval before selecting their options. The ease and convenience of such transactions tend to make such terminals easy targets for unauthorized users. Although some terminals and/or electronic cards also require users to enter a password or personal identification number (PIN), this information also can be easily compromised. Thus, an improved algorithm with enhanced but not unduly difficult security features for interfacing users of service-oriented terminals is needed.

SUMMARY OF THE INVENTION

A method and system for prompting a repeat user of a payment card at an interface terminal with additional security-related questions when the user selects responses that deviate from his or her typical selections. The payment card is read at the terminal, its line of credit is authorized, and a profile of the user's purchasing habits is retrieved. The user then enters his or her current selection of options. A determination is then made as to whether the user's current selections match his or her user profile. If the user's current selections match the user profile, the process allows the user to obtain the services or facilities. If the user's current selections do not match the user profile, the process queries the user with additional security questions to ascertain whether the current user is an authorized user. If the user is unable to answer the security questions correctly, the process prevents the user from accessing the services or facilities. If the user is able to answer the security questions correctly, the process allows the current user to begin fueling his or her vehicle, for example.

Accordingly, it is an object of the invention is to provide a method and system for interfacing with customers at service-oriented terminals.

It is an additional object of the invention is to provide a method and system for service-oriented, user interface terminals where users make purchases electronically.

Yet another object of the invention is to provide a system and method for automatically authorizing a remote point of purchase action at a facility which permits such actions.

Additional objects and advantages of the invention will become apparent in light of the description which follows.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

The present invention may be executed in a variety of systems including computer systems having various operating systems. The computer system may be a personal computer, a network computer, a midrange computer or a mainframe computer. In addition, the computer may be a stand-alone system or part of a network such as a local-area network (LAN) or a wide-area network (WAN). For the purposes of illustration, one embodiment of the present invention, as described below, is implemented utilizing a personal computer.

Figure 1:
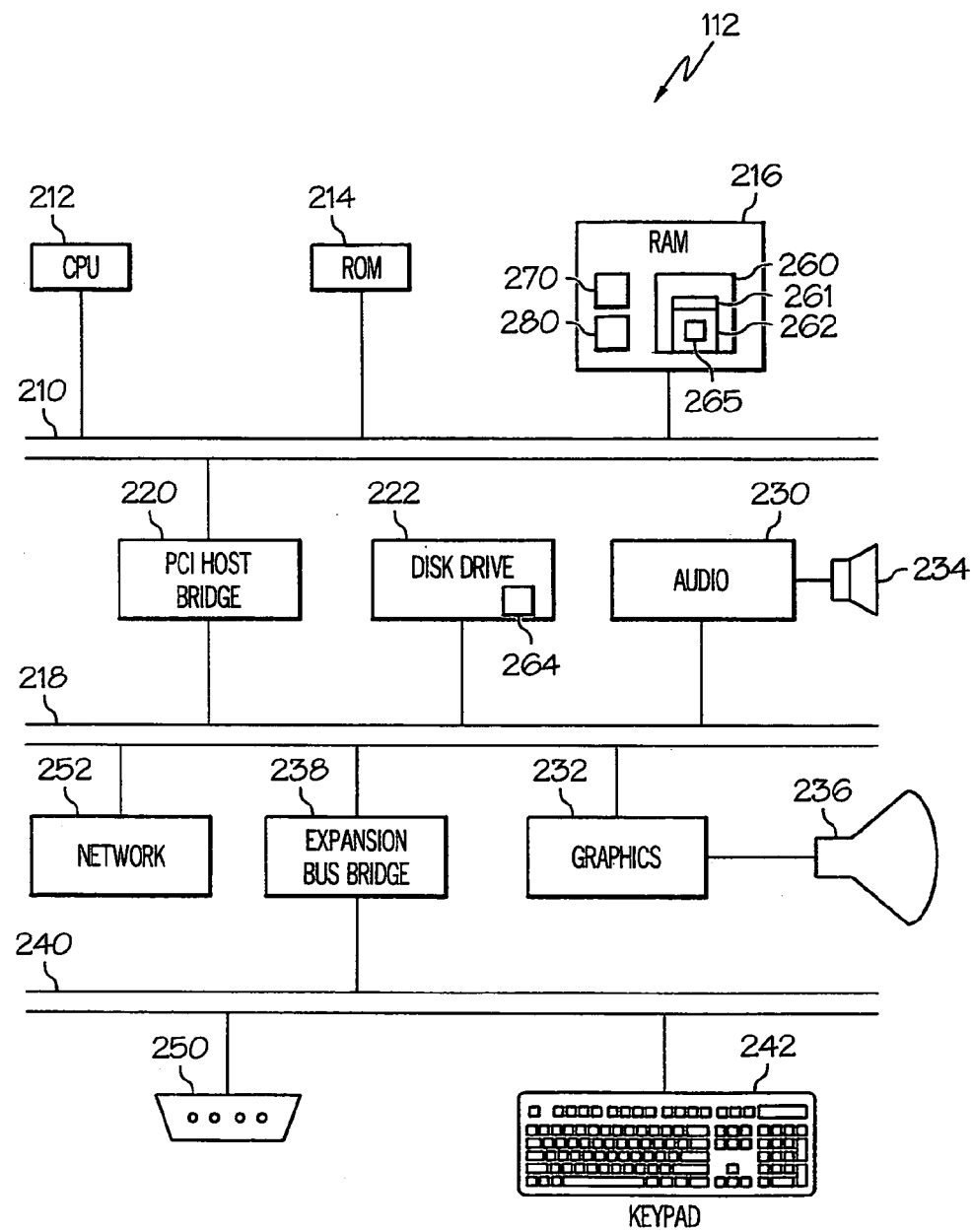
FIG. 1 depicts a schematic diagram of an illustrative embodiment of an automated refueling station interface terminal constructed in accordance with the method and system of the present invention.

Referring now to FIG. 1, there is depicted a block diagram of a server 112. Server 112 includes a system bus 210 that is connected to a central processing unit (CPU) 212 and to memory, including read only memory (ROM) 214 and random access memory (RAM) 216. System bus 210 is coupled to a PCI local bus 218 through a PCI host bridge 220. PCI local bus 218 is connected to additional nonvolatile data storage devices, such as one or more disk drives 222, and to an audio adapter 230 and a graphics adapter 232 for controlling audio output through a speaker 234 and visual output through a display device 236, respectively. A PCI-to-ISA bus bridge, such as expansion bus bridge 238, connects PCI local bus 218 to an ISA bus 240, which is attached (through appropriate adapters) to a keypad 242 for receiving operator input.

Also included within server 112 are data ports for communicating with external equipment, such as other data processing systems. The data ports include, without limitation, a serial port 250 attached to ISA bus 240 for linking server 112 to remote data processing systems (such as a bridge) via a modem (not illustrated) and a communications adapter 252 attached to PCI bus 218 for linking server 112 to other stations of a LAN (such as clients).

Server 112 also contains software applications that are stored on the data storage devices and loaded into RAM 216 for execution by CPU 212. Among those applications is a communications program, such as communications manager 260, that manages the exchange of information between the LAN and remote data processing systems. Included in communications manager 260 is a connection initiator 261 for establishing dial-up connections to remote data processing systems. Communications manager 260 also includes Internet sharing software 262 that enables multiple LAN stations to access the Internet via a single connection. In the illustrative embodiment, server 112 also includes a connection schedule file 264, which preferably is stored in disk drive 222, and Internet sharing software 262 includes a request predictor 265 that utilizes connection schedule file 264 to trigger connection initiator 261 in advance of anticipated communication requests.

Connection schedule file 264 is maintained by a schedule editor and/or an automatic schedule modifier, each of which is preferably also included in Internet sharing software 262. Server 112 also includes a Web browser 270 and an E-mail client 280 that allow an operator of server 112 or client to retrieve and view information from the Internet and send and receive E-mail via the Internet, respectively.

Figure 2:
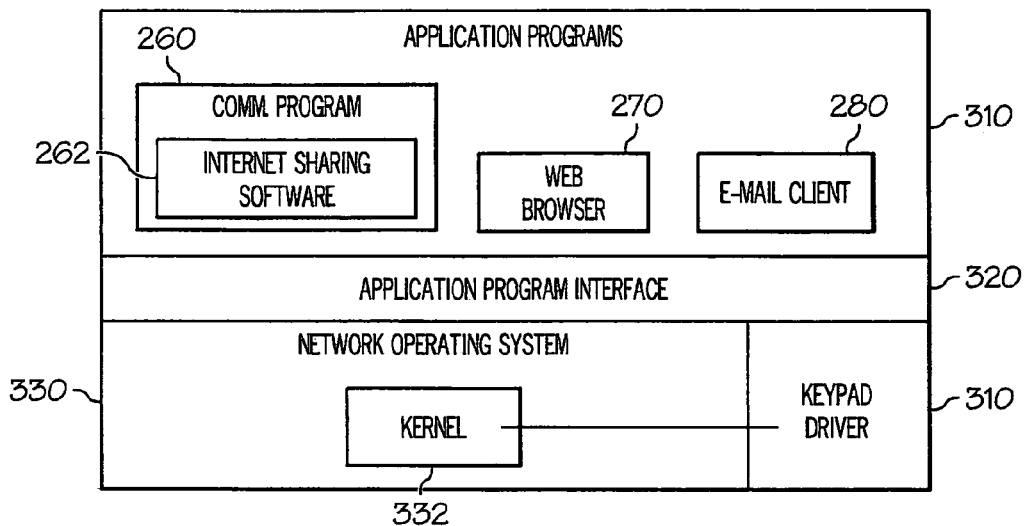
FIG. 2 is a layer diagram of the programs in the data processing system of FIG. 1 that cooperate to automatically connect to a remote data processing system according to the method and system of the present invention.

With reference now to FIG. 2, there is depicted a layer diagram of the software applications within server 112 that cooperate to provide the functionality of the present invention according to the illustrative embodiment. At the highest level of the layer diagram are the software application programs 310, including communications manager 260, web browser 270, and E-mail client 280. At the intermediate level is an application program interface (API) 320, through which application programs 310 request services from the operating system 330. Operating system 330, which occupies the lowest level of the layer diagram, is a network operating system. As such, in addition to managing the operations of server 112 (by performing duties such as resource allocation, task management, and error detection), operating system 330 also provides tools for managing communications within the LAN and between LAN stations and remote data processing systems. Included within operating system 330 is a kernel 332 that manages the memory, files, and peripheral devices of server 112. The lowest level also includes device drivers, such as a keypad driver 340 that kernel 332 utilizes to manage input from and output to peripheral devices.

For purposes of illustration of the invention, an automotive refueling station having a fuel pump equipped with a user interface terminal 81 (FIG. 3) is described. Terminal 81 includes a display screen 83 and option buttons 85 that can be selected by the user when prompted by the system.

Figure 4:
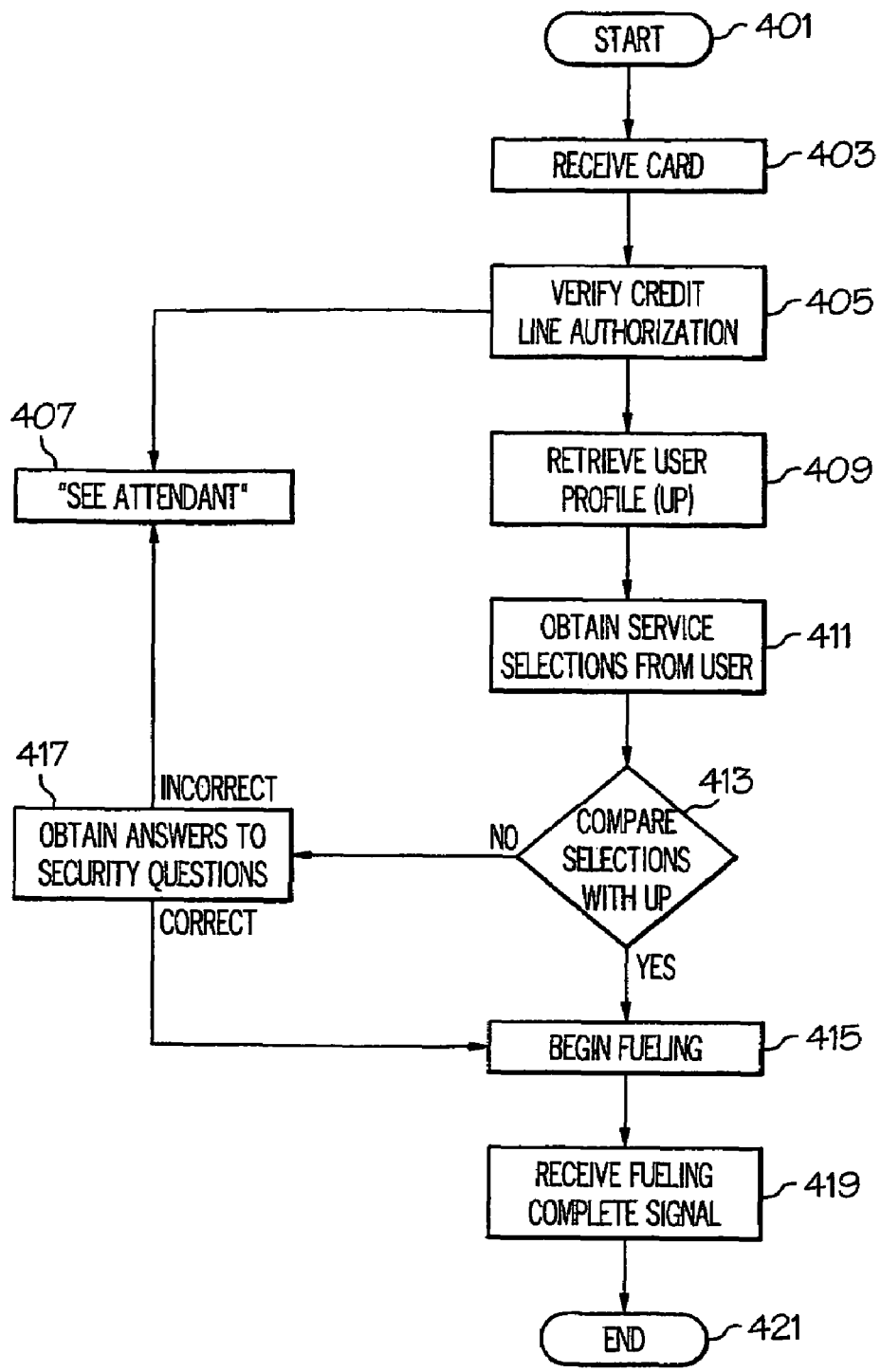
FIG. 4 is a high level, logical flowchart of an illustrative embodiment of the method and system of the present invention utilized by the automated refueling station of FIG. 1 for qualifying users of credit or debit cards.

Referring now to FIG. 4, there is illustrated one embodiment of a high level, logic flow diagram of a method for prompting repeat users of payment and/or identification cards, at interface terminals with additional security-related questions when the users select responses that deviate from their typical selections. Note that the present invention is capable of tracking the selections of an authorized user across multiple interface terminals while he or she is using cards with different account numbers. Alternatively, the invention is also adapted to track the selections of an authorized user at individual interface terminals with a single card, or any combination of these scenarios.

Figure 3:
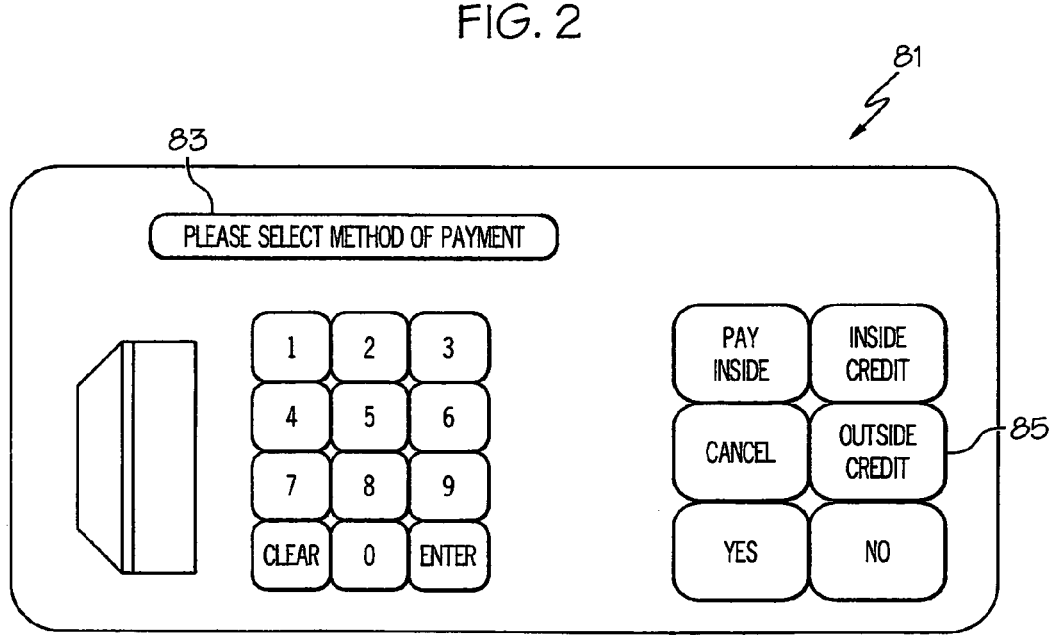
FIG. 3 is a schematic diagram of an optional user interface terminal for the data processing system of FIG. 1.

In one embodiment, a fuel pump is equipped with the terminal 81 of FIG. 3, and the algorithm begins as illustrated at block 401 (FIG. 4). A credit or debit card for purchasing fuel at a fuel pump is scanned or read, as shown in block 403. The credit or debit card may be any electronically, magnetically, optically, or otherwise scanned device. As depicted in block 405, a determination is then made as to whether or not a line of credit or debit is authorized by the card issuer. If the card is not authorized, the process proceeds to block 407. Block 407 illustrates displaying within display screen 83 "See attendant," "Authorization denied," or similar message for conveying to the user that an alternate means of payment is required.

If the card is authorized, the process proceeds to block 409. Block 409 depicts the retrieval of a user profile (UP) for the authorized user of the card. The user profile represents the routine or typical selections that this particular user chooses when given the same choice of options at each visit. For example, when the user utilizes his or her card at the fuel pump of a refueling station, the user is always prompted by the following inquiries: (a) "Would you like a receipt for this purchase?"; (b) "Select fuel grade."; (c) "Would you like a car wash?", and, if so, (d) "Select type of car wash." Since some users tend to select the same set of options at every visit, a user profile of the typical selections for each user can be generated. For example, in the last n visits (e.g., five visits), the user has never requested a receipt, always selected premium unleaded fuel, and always purchased an economy car wash. This hypothetical user's purchase habits readily generate a user profile that can be used as a low-level security check or threshold for determining whether an unauthorized user is using the card.

After the user's profile is obtained, as depicted in block 409, the process proceeds to block 411 wherein the user enters his or her current selection of options. A determination is then made whether the user's current selections match his or her user profile, as illustrated in block 413. Alternatively, a limited number of selections (e.g., one or two) that are inconsistent with the authorized users typical answers may be allowed. If the user's current selections match or are similar to the user profile, the process proceeds to block 415. Block 415 illustrates displaying a "Begin fueling" message to the user. If the user's current selections do not match the user profile or, alternatively, are not within a desired range of consistency with the user profile, the process proceeds to block 417. Block 417 depicts a determination of whether the current user can answer selected questions with information that an authorized user would possess. The questions posed to the current user can number one or more, and may be varied in difficulty. Possible prompts include: "enter your zip code," "enter your phone number," or, "enter your password or PIN," to name a few. In addition questions of a more personal, differentiating nature may also be queried. Thus, block 417 represents a security check for screening users who, at the very least, are selecting atypical options for the card, or worse, users who are unauthorized to use the card.

If the current user is unable to answer the security question(s) of block 417 correctly, the process again proceeds to block 407, which illustrates displaying a "See attendant," "Authorization denied," or similar message for conveying to the current user that alternate means of payment are required. If the current user is able to answer the security question(s) of block 417 correctly, the process proceeds to block 415 which depicts permitting the current user to begin fueling his or her vehicle. Block 419 illustrates a determination of whether a "fueling complete" signal has been received by the process. When the user has completed the fueling of his or her vehicle the fueling complete signal is received by the process, and the process exits as illustrated at block 421.

The present invention has several advantages. The process allows current users of credit or debit cards to be screened for security purposes based upon their selection of options. If the option selected by the current user are inconsistent or atypical for the authorized user of the card, the process prompts the current user with additional security-related questions in an attempt to prevent unauthorized use of the card.

It is also important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD-ROMs and transmission-type media such as analogue or digital communications links.

The invention claimed is:

1. A method for automatically authorizing a remote point of purchase action at a facility which permits such actions, said method comprising the steps of:
    storing selections of goods and/or services made by an authorized user during a previous transaction;
    prompting a user with options for selecting goods and/or services during a current transaction at the facility;
    comparing the options for goods and/or services selected by the user with the user's prestored selections of goods and/or services;
    requiring the user to answer a security-related question if the options for goods and/or services selected by the user are inconsistent with the user's prestored selections of goods and/or services; and
    thereafter permitting the current transaction only if the user correctly answers said security-related question.

2. The method of claim 1 wherein the step of storing selections comprises generating a user profile of selections of goods and/or services made by the user during the last n transactions.

3. The method of claim 1 wherein the step of storing selections comprises storing selections of goods and/or services made by the user at a plurality of facilities.

4. The method of claim 1 wherein the step of storing selections comprises storing selections of goods and/or services made by the user while using a credit or debit card.

5. The method of claim 1 wherein the step of storing selections comprises storing selections of goods and/or services made by the user while using a plurality of credit or debit cards, wherein each of the credit or debit cards has a different account number.

6. The method of claim 1 wherein the step of requiring the user to answer a security-related question is not required if the user's current selections match the prestored selections or are within a desired range of consistency with the prestored selections.

7. The method of claim 1 wherein the step of requiring the user to answer a security-related question entails requiring the user to answer a plurality of security-related questions, and wherein the step of permitting the current transaction requires the user to answer each of the security-related questions correctly.

8. A method for automatically authorizing a remote point of purchase action with a credit or debit card at facilities which permit such actions, said method comprising the steps of:
    storing selections of goods and/or services made by an authorized user during the previous n transactions with the credit or debit card at the facilities and generating a user profile of goods and/or services in response thereto;
    prompting a current user with options for goods and/or services during a current transaction with the credit or debit card at one of the facilities;
    comparing the options for goods and/or services selected by the current user with the user profile of goods and/or services;
    requiring the current user to answer a security-related question if the options for goods and/or services selected by the current user do not match the user profile of goods and/or services, or are not within a desired range of consistency with the prestored selections of goods and/or services; and then
    permitting the current transaction only if the current user correctly answers said security-related question.

9. The method of claim 6 wherein the step of storing selections comprises storing selections of goods and/or services made by the authorized user while using a plurality of credit or debit cards at various ones of the facilities, wherein each of the credit or debit cards has a different account number.

10. The method of claim 8 wherein the step of requiring the current user to answer a security-related question entails requiring the current user to answer a plurality of security-related questions, and wherein the step of permitting the current transaction requires the current user to answer each of the security-related questions correctly.

11. A system for automatically authorizing a remote point of purchase action at a facility which permits such actions, comprising:
    a memory for storing previous selections of goods and/or services made by an authorized user;
    a user terminal adapted to prompt a user with options for goods and/or services during a transaction at the facility;
    processor means for comparing options for goods and/or services selected by the user at the user terminal during a current transaction with the previous selections of goods and/or services stored in the memory;
    control means for requiring the user to answer a security-related question when the options for goods and/or services selected by the user at the user terminal during the current transaction do not match the previous selections of goods and/or services stored in the memory, or are not within a desired range of consistency with the previous selections of goods and/or services, and for thereafter permitting the current transaction only when the user correctly answers said security-related question.

12. The system of claim 11 wherein the memory generates a user profile of selections of goods and/or services made by the user during the last n transactions.

13. The system of claim 11 wherein the user terminal is a device for reading a credit or debit card.

14. The system of claim 11 wherein the control means requires the user to correctly answer a plurality of security-related questions.

15. A computer program product, residing on a computer usable medium and having computer usable program means embodied therein, said computer usable program means comprising:
    means for storing selections of goods and/or services made by an authorized user during a previous transaction;

means for prompting a user with options for goods and/or services during a current transaction at the facility;

means for comparing options for goods and/or services selected by the user with the prestored selections of goods and/or services;

means for requiring the user to answer a security-related question if the options for goods and/or services selected by the user do not match the prestored selections of goods and/or services, or are not within a desired range of consistency with the restored selections of goods and/or services; and means for permitting the current transaction only if the user correctly answers said security-related question.

16. The computer program product of claim 15 wherein the means for storing selections generates a user profile of selections of goods and/or services made by the user during the last n transactions.

17. The computer program product of claim 15 wherein the means for storing selections stores selections of goods and/or services made by the user at a plurality of facilities.

18. The computer program product of claim 15 wherein the means for storing selections stores selections of goods and/or services made by the user while using a credit or debit card.

19. The computer program product of claim 15 wherein the means for storing selections stores selections of goods and/or services made by the user while using a plurality of credit or debit cards, wherein each of the credit or debit cards has a different account number.

20. The computer program product of claim 15 wherein the means for requiring the user to answer a security-related question is not required if the user's current selections match the prestored selections or are within a desired range of consistency with the prestored selections.

21. The computer program product of claim 15 wherein the means for requiring the user to answer a security-related question entails requiring the user to answer a plurality of security-related questions, and wherein the means for permitting the current transaction requires the user to answer each of the security-related questions correctly.

* * * * *